(12) United States Patent
Kreft

(10) Patent No.: US 7,347,478 B2
(45) Date of Patent: Mar. 25, 2008

(54) STRUCTURAL FASTENING VARIABLE SLIP BUSHING

(75) Inventor: Gregory R. Kreft, Rochester, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 5 days.

(21) Appl. No.: 11/479,508

(22) Filed: Jun. 30, 2006

(65) Prior Publication Data

US 2007/0046092 A1 Mar. 1, 2007

Related U.S. Application Data

(60) Provisional application No. 60/695,487, filed on Jun. 30, 2005.

(51) Int. Cl.
*B60N 2/015* (2006.01)
*F16B 7/18* (2006.01)

(52) U.S. Cl. ............. 296/65.03; 248/503.1; 403/387; 403/408.1; 411/546

(58) Field of Classification Search ......... 296/37.14, 296/37.15, 63, 65.03; 16/2.1, 2.2, 2.3, 2.4, 16/2.5; 248/503.1; 403/387, 408.1; 411/180, 411/338, 546
See application file for complete search history.

(56) References Cited

U.S. PATENT DOCUMENTS

| | | | | |
|---|---|---|---|---|
| 4,155,809 A | * | 5/1979 | George et al. | 376/463 |
| 4,427,318 A | * | 1/1984 | Kaminski | 403/408.1 |
| 4,776,533 A | * | 10/1988 | Sheek et al. | 244/118.6 |
| 4,900,178 A | * | 2/1990 | Haldric et al. | 403/24 |
| 5,058,829 A | | 10/1991 | Bentley | |
| 5,083,726 A | * | 1/1992 | Schurr | 244/118.6 |
| 5,337,979 A | * | 8/1994 | Bales et al. | 244/118.1 |
| 5,527,080 A | | 6/1996 | Wahlqvist | |
| 6,033,028 A | | 3/2000 | Lovdahl | |
| 6,155,739 A | * | 12/2000 | Sekine et al. | 403/12 |
| 6,174,117 B1 | * | 1/2001 | Kawatani et al. | 411/107 |
| 6,318,927 B1 | * | 11/2001 | Schafer et al. | 403/408.1 |
| 6,357,955 B1 | * | 3/2002 | Hoffmann et al. | 403/79 |
| 7,163,178 B2 | * | 1/2007 | Ricaud | 244/118.1 |
| 2002/0054806 A1 | * | 5/2002 | Sakamura et al. | 411/180 |
| 2004/0033105 A1 | * | 2/2004 | North | 403/408.1 |

FOREIGN PATENT DOCUMENTS

RU 2267035 C * 12/2005 ............ 411/180

* cited by examiner

*Primary Examiner*—D. Glenn Dayoan
*Assistant Examiner*—Paul Chenevert
(74) *Attorney, Agent, or Firm*—Clark Hill PLC

(57) ABSTRACT

A variable slip bushing is disposed within a bore of a first structure for closing a gap between the first structure and a second structure. The variable slip bushing includes an axial bore for receiving a fastener therethrough. The variable slip bushing also includes an outer wall slidably engaging the bore of the first structure for closing the gap as the fastener is tightened against the variable slip bushing to secure the first structure to the second structure.

17 Claims, 3 Drawing Sheets

STRUCTURAL FASTENING VARIABLE SLIP BUSHING

FIELD OF THE INVENTION

This invention relates to a variable slip bushing. More particularly, the invention relates to a vehicle seat assembly having a variable slip bushing for closing a gap between first and second structures connected by a fastener.

DESCRIPTION OF THE PRIOR ART

Motor vehicle seat assemblies are often assembled before being installed in a motor vehicle. Typically, each seat assembly include a plurality of legs fixedly attached to attachment structures disposed along a floor of the motor vehicle. During installation, most seat assemblies must be tilted or otherwise angled into the motor vehicle due to the size and orientation of the seat assembly. In other words, the seat assembly is not able to be inserted upright into the motor vehicle and then simply lowered into place along the floor. For this reason, the foot of the seat assembly cannot be sized to exactly fit the attachment structure on the floor. As a result, the foot must be oversized relative to the attachment structure. The oversized foot allows the foot to be applied to the attachment structure at a non-perpendicular angle, partially assembled and then rotated for full assembly, wherein the attachment structure is fully nested within the foot. The oversized foot creates a gap or space between the attachment structure and the foot. A fastener will clamp against the outer sides of the foot, but will be unable to clamp the foot firmly against the attachment structure once the seat assembly is fully installed. This gap causes severe rattle and raises the additional concern of a weakening attachment over time. There is, therefore, a need for a joint that resolves the aforementioned problems.

SUMMARY OF THE INVENTION

According to one aspect of the invention, a variable slip bushing is disposed within a bore of a first structure for closing a gap between the first structure and a second structure. The variable slip bushing includes an axial bore for receiving a fastener therethrough. The variable slip bushing also includes an outer wall slidably engaging the bore of the first structure for closing the gap as the fastener is tightened against the variable slip bushing to secure the first structure to the second Structure.

According to another aspect of the invention, there is provided a vehicle seat assembly having a plurality of legs for securing the seat assembly to a plurality of floor mounting structures on a vehicle floor. The plurality of floor mounting structures each has a first dimension, at least one of the plurality of legs has an inverted U-shaped foot. The foot has a first flange spaced from a second flange by a second dimension. The second dimension exceeds the first dimension by a predetermined amount enabling the seat assembly to be moved towards the vehicle floor at an angle and the at least one foot engages a corresponding one of the plurality of floor mounting structures. The seat assembly is then rotated allowing the at least one foot to engage the corresponding one of the plurality of floor mounting structures in a nesting relation. The first flange has a first threaded bore and the second flange having a bushing functionally engaging a second bore. The second bore aligns with the first bore for receiving a threaded fastener. As the threaded fastener threadingly engages the nut, the fastener urges the bushing to engage the floor mounting structure taking up the predetermined amount so that the fastener firmly clamps the foot onto the floor mounting structure.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
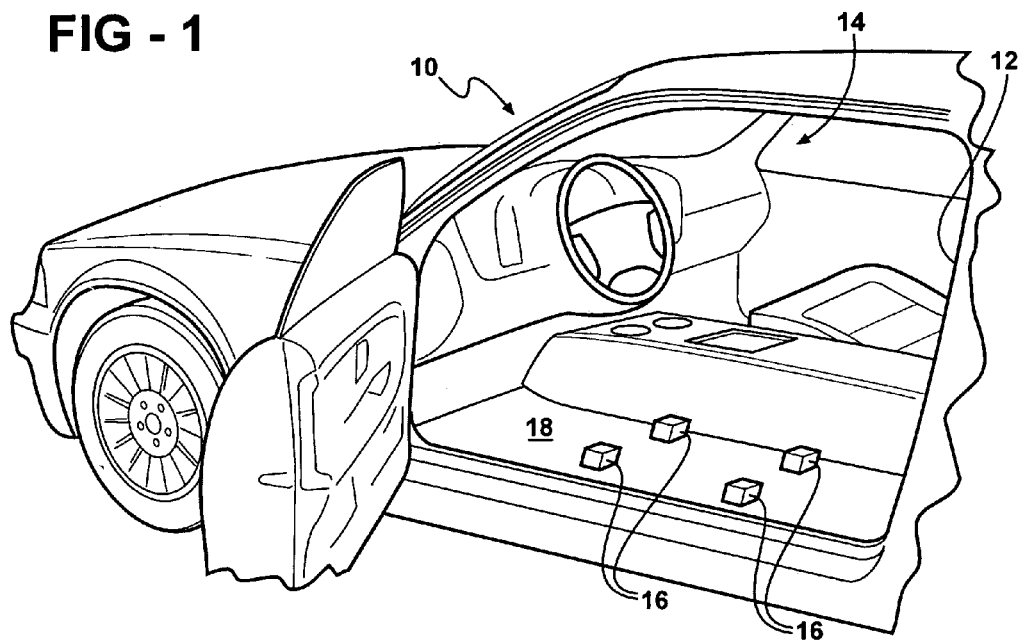
FIG. 1 is a fragmentary, perspective view of a motor vehicle including attachment structures disposed along a floor.
Figure 2:
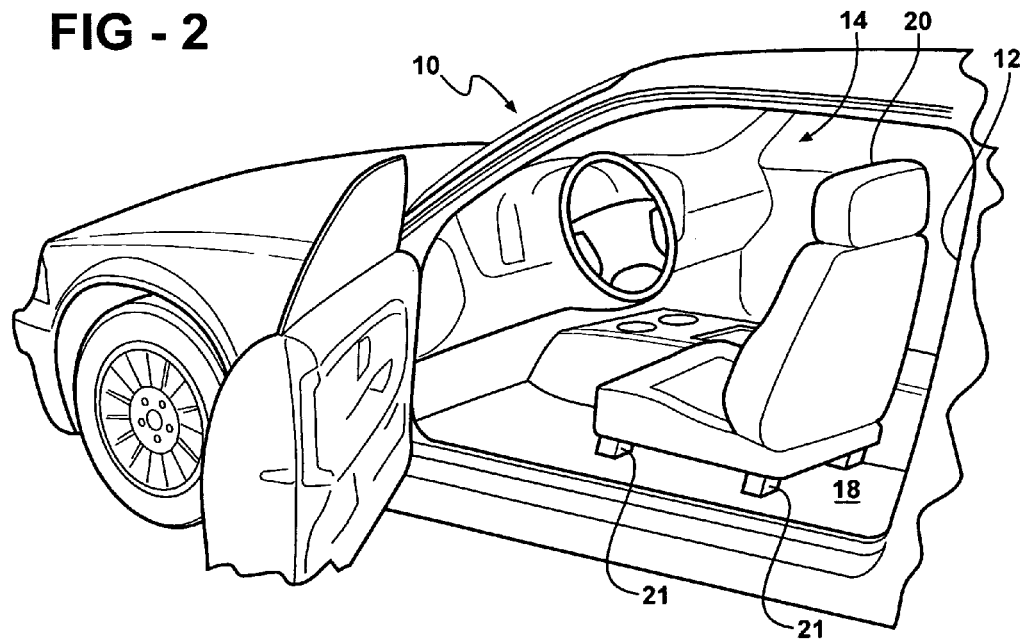
FIG. 2 is a fragmentary, perspective view of the motor vehicle including a seat assembly disposed along the floor.

Referring to FIGS. 1 and 2, a motor vehicle 10, includes at least one door opening 12 for providing access to an interior portion 14. Although the Figures illustrate a front driver's side seat assembly, it will become readily apparent to those skilled in the art that the present invention is applicable to other seat assemblies, particularly including bench type second and third row seat assemblies and 60-40 split seat assemblies.

A plurality of attachment or floor mounting structures 16 is positioned in a spaced apart relation from one another on a floor 18 within the interior portion 14 of the motor vehicle 10. The floor mounting structures 16 are normally paired between a forward row and a rearward row of floor mounting structures 16.

A seat assembly 20 is positioned on the floor 18 for supporting an occupant. The seat assembly 20 includes a plurality of legs 21 each coupled to one of the plurality of attachment structures 16 for retaining the seat assembly 20 along the floor 18. The seat assembly 20 normally has a row of forward legs and row of rearward legs.

Figure 3:
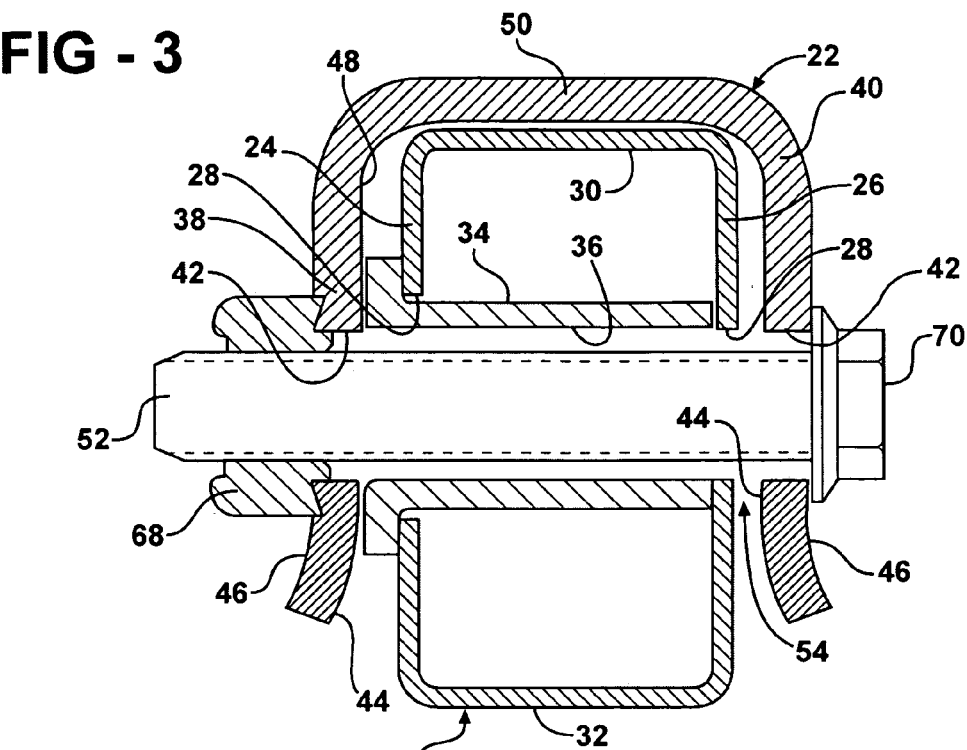
FIG. 3 is a cross-sectional view of a PRIOR ART fastener securing a leg of the seat assembly to one of the attachment structures wherein a gap is present between the leg and the attachment structure.
Figure 4:
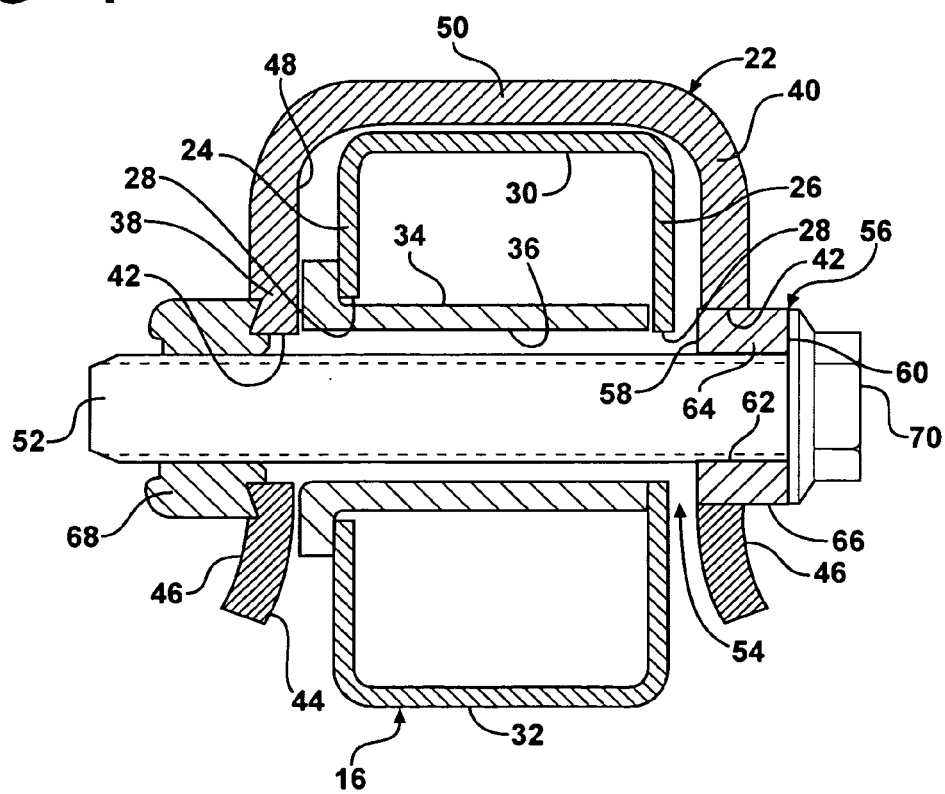
FIG. 4 is a cross-sectional view similar to FIG. 3 but including a variable slip bushing in a install position.
Figure 5:
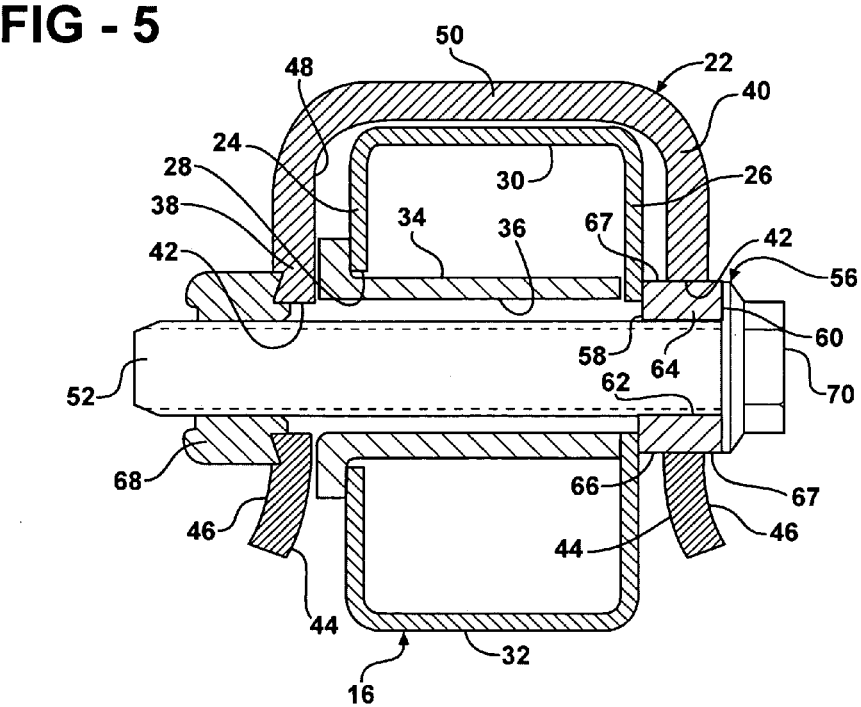
FIG. 5 is a cross-sectional view similar to FIG. 3 but including the variable slip bushing in an activated position closing the gap between the leg and the attachment Structure.
Figure 6:
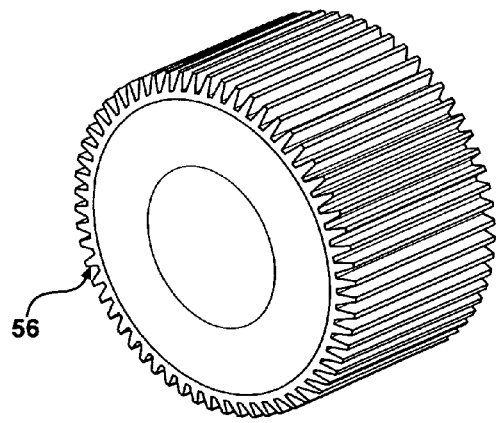
FIG. 6 is a perspective view of the variable slip bushing of FIGS. 4 and 5.
Figure 7:
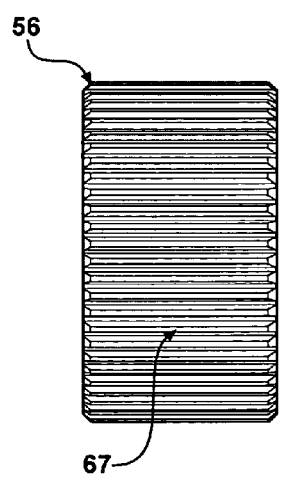
FIG. 7 is a side elevational view of the variable slip bushing of FIGS. 4 and 5.

Referring to FIGS. 3 through 5, each attachment structure 16 is a tubular frame having a generally rectangular cross-section and including spaced apart outer walls 24, 26 each defining an aperture 28. A pair of spaced apart connecting walls 30, 32 extends between the outer walls 24, 26. It is contemplated that although the attachment structure 16 has been shown and described as a tubular frame, the particular configuration of the attachment structure 16 may vary. For example, the attachment structure 16 may have a U or inverted U shaped cross-section and include only one of the connecting walls 30, 32 extending between the outer walls 24, 26.

A cold formed sleeve 34 is welded to the attachment structure 16 to define an elongated bore 36 between the spaced apart outer walls 24, 26. It is, however, appreciated that the attachment structure 16 may be formed without the cold formed sleeve 34.

Each leg 21 has a foot 22 that has an inverted U-shape and includes a pair of spaced apart flanges or side members 38, 40 each having a bore 42. Each of the pair of spaced apart flanges 38, 40 includes an inboard surface 44 and an outboard surface 46. The pair of spaced apart flanges 38, 40 and bight member 50 that extends between the pair of spaced apart flanges 38, 40 defines an inverted U-shaped channel 48.

In order to couple the seat assembly 20 to the floor 18, the attachment structure 16 is received and nested within the inverted U-shaped channel 48 such that each of the spaced apart outer walls 24, 26 is generally adjacent one of the pair of spaced apart flanges 38, 40. When the attachment structure 16 is received within the inverted U-shaped channel 48, the elongated bore 36 of the attachment structure 16 aligns with the bores 42 of the pair of spaced apart flanges 38, 40 in order to receive a threaded fastener or bolt 52 therethrough. The fastener 52 is inserted through the bores 36, 42 to secure the foot 22 to the attachment structure 16.

It is, however, appreciated that in the typical situation, shown in FIG. 3, the attachment between the foot 22 and the attachment structure 16 via the fastener 52 is not snug. During vehicle assembly, the seat assembly 20 must be tilted or otherwise angled in order to pass through the door opening 12 and thus, either the rearward or forward legs of the seat assembly 20 approaches the attachment structures 16 at an angle relative to the floor. For this reason, the inverted U-shaped channel 48 must be wider in a least one dimension than a corresponding dimension of the attachment structure 16, that is, the distance between the pair of spaced apart side members 38, 40 must have a dimension that greater than the corresponding dimension of the attachment structure 16. In the preferred embodiment, the key dimension is in the vehicle fore-aft direction. The arrangement ensures that the seat assembly 20 can be maneuvered within the vehicle attachment structure 16 and then installed with the attachment structure 16 nested within the channel 48. Additionally, the ends of flanges 38, 40 may be flared to increase ease of installation.

Since the foot 22 has a greater dimension than the attachment structure 16, a gap or space, generally shown at 54, is present between one of the outer walls 26 of the attachment structure 16 and one of the flanges 40 of the foot 22. The tightening of the fastener 52 does not by itself close the gap 54 since the foot 22 is manufactured from a heavy stamped sheet steel. The presence of the gap 54 results in rattling and increases the possibility of loosening or weakening of the attachment between the attachment structure 16 and the foot 22 over time.

Referring to FIGS. 4 and 5, a variable slip bushing, generally indicated at 56, is provided to close the gap 54. The variable slip bushing 56 includes opposing first 58 and second 60 ends. An axial bore 62 extends between the first 58 and second 60 ends for receiving the fastener 52 therethrough. The axial bore 62 defines an inner wall 64 opposite an outer wall 66. A plurality of knurled teeth 67 is formed along the outer circumferential surface 66.

The variable slip bushing 56 is disposed within the aperture or bore 42 of one of the side members 40 of the foot 22. Preferably, the bushing 56 is press fitted into the bore 42. The plurality of teeth 67 engages with the bore 42 in an interference or frictional fit. The teeth 67 prevent the variable slip bushing 56 from rotating with the fastener 52. Instead the variable slip bushing 56 slides axially into the installed position as the fastener 52 rotates.

The variable slip bushing 56 is movable between an install position, shown in FIG. 4, and an installed position, shown in FIG. 5. In the install position, the first end 58 of the variable slip bushing 56 is flush with the inboard surface 44 of one of the side members 40 of the foot 22. Upon tightening of the fastener 52, which is threadingly received by a nut 68 affixed to the outer surface 46 of flange 38, presenting a threaded bore, head 70 of the fastener 52 urges the variable slip bushing 56 into the installed position.

In the installed position, the first end 58 of the variable slip bushing 56 abuts one of the outer walls 26 of the attachment structure 16 to take up the gap 54 and firmly clamp the foot 22 against the attachment structure 16, thereby eliminating rattles that would otherwise occur in the absence of the variable slip bushing 56. The result is a solid structural joint between the attachment structure 16 and the foot 22. Preferably, a 70 nm torque is required to clamp the foot 22 to the attachment structure 16.

It is appreciated that although the variable slip bushing 56 has been disclosed with the plurality of teeth 67, the outer wall 66 of the variable slip bushing 56 may include any of a variety of surface formations or configurations that allow the variable slip bushing 56 to slide into the activated position, but not rotate with the fastener 52, as the fastener 52 is being tightened, including a knurled finish. Further, one skilled in the art will also appreciate that the variable slip bushing 56 as disclosed could be used with numerous legs 21. Preferably, either the forward or rearward row of legs 21 will have the bushing 56. The opposite row of legs 21 can be attached in the conventional manner since the foot can be more closely dimensioned relative to the attachment structure 16.

Finally, one skilled in the art will appreciate that although the variable slip bushing 56 has been disclosed for joining a foot 22 of a seat assembly 20 to an attachment structure 16, the variable slip bushing 56 according to the invention may be used in a variety of applications where there is a gap or space between joined structures that cannot be closed by tightening a fastener.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A bushing for attaching a first structure to a second structure, said first structure having a U-shape and sized to nestingly receive said second structure, a first threaded bore and a second bore axially aligned with said first threaded bore, said bushing having an axial bore for receiving a fastener, said fastener threadingly engaging said first threaded bore, said bushing frictionally engaging with said second bore of said first structure enabling the bushing to slide axially relative the first structure and engage said second structure closing a gap between the first structure and the second structure as the fastener is tightened securely clamping the first structure against the second structure.

2. A bushing as set forth in claim 1, wherein said bushing has an outer circumferential surface having a knurled finish.

3. A bushing as set forth in claim 2, wherein said knurled finish forms a plurality of teeth.

4. A bushing as set forth in claim 3, wherein said first structure comprises a first flange spaced from a second flange joined by a bight member defining said U-shape, and said first flange has said first threaded bore and said second flange has said second bore.

5. A bushing as set forth in claim 4, wherein said first threaded bore comprises a nut affixed to an outer surface of said first flange.

6. A bushing as set forth in claim 5, wherein said second structure has a through bore that aligns with said first threaded bore and said second bore.

7. A bushing as set forth in claim 6, wherein said second structure is hollow and has a sleeve extending into said through bore, said sleeve supporting said second structure as said first structure is clamped against said second structure.

8. A bushing as set forth in claim 7, wherein said first structure is mounted on a leg of a vehicle seat assembly and said second structure is an attachment on a vehicle floor.

9. A bushing as set forth in claim 1, wherein said first structure comprises a first flange spaced from a second flange joined by a bight member defining said U-shape, and said first flange has said first threaded bore and said second flange has said second bore.

10. A vehicle seat assembly having a plurality of legs for securing said seat assembly to a plurality of floor mounting structures on a vehicle floor, said plurality of floor mounting structures each having a first dimension, at least one of said plurality of legs having an inverted U-shaped foot, said foot having a first flange spaced from a second flange by a second dimension, said second dimension exceeding said first dimension by a predetermined amount enabling said seat assembly to be moved towards said vehicle floor at an angle and said at least one foot to engage a corresponding one of said plurality of said floor mounting structures and then rotating said seat assembly allowing said at least one foot to engage said corresponding one of said plurality of floor mounting structures in a nesting relation, said first flange having a first threaded bore and said second flange having a bushing frictionally engaging a second bore, said second bore aligned with said first bore, said first bore receiving a threaded fastener extending through said bushing, wherein as said threaded fastener threadingly engages said nut, said fastener urges said bushing to engage said floor mounting structure taking up said predetermined amount so that said fastener firmly clamps said foot onto said floor mounting structure.

11. A vehicle seat assembly as set forth in claim 10, wherein said bushing has an outer circumferential surface having a knurled finish.

12. A vehicle seat assembly as set forth in claim 11, wherein said knurled finish presents a plurality of teeth.

13. A vehicle seat assembly as set forth in claim 12, wherein said first threaded bore comprises a nut affixed to an outer surface of said first flange.

14. A vehicle seat assembly as set forth in claim 13, wherein each of said plurality of floor mounting structures are hollow and has a sleeve extending into a through bore, said sleeve supporting said floor mounting structure as said foot is clamped onto said floor mounting structure.

15. A vehicle seat assembly as set forth in claim 10, wherein said first threaded bore comprises a nut affixed to an outer surface of said first flange.

16. A vehicle seat assembly as set forth in claim 15, wherein said plurality of legs comprises a forward row of legs and a rearward row of legs and each leg of at least one of said forward row and said rearward row has said foot.

17. A vehicle seat assembly as set forth in claim 10, wherein each of said plurality of floor mounting structures are hollow and has a sleeve extending into a through bore, said sleeve supporting said floor mounting structure as said foot is clamped onto said floor mounting structure.

* * * * *